(No Model.)
F. H. WHEELAN & R. W. JESSUP.
SEPARATOR.
No. 508,792. Patented Nov. 14, 1893.
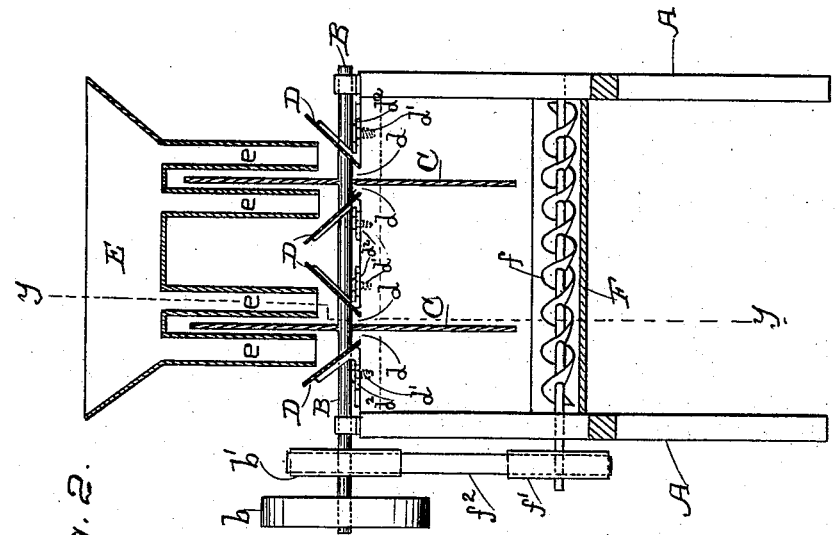
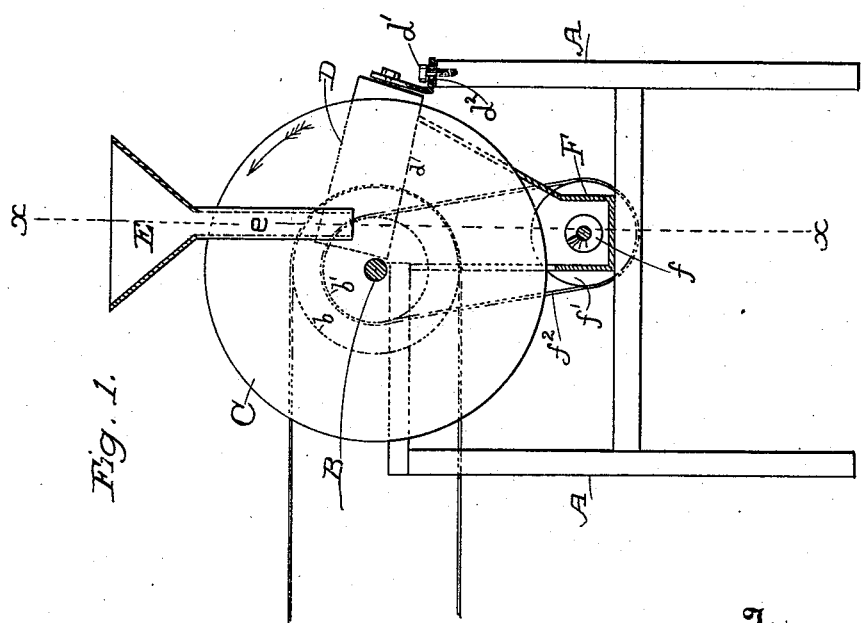
Witnesses,
Inventors,
Fairfax H. Wheelan
Robert W. Jessup.
By Dewey & Co.
Attys.

UNITED STATES PATENT OFFICE.

FAIRFAX H. WHEELAN, OF SANTA BARBARA, AND ROBERT W. JESSUP, OF LOS ANGELES, CALIFORNIA.

SEPARATOR.

SPECIFICATION forming part of Letters Patent No. 508,792, dated November 14, 1893.

Application filed February 10, 1893. Serial No. 461,791. (No model.)

*To all whom it may concern:*

Be it known that we, FAIRFAX H. WHEELAN, residing at Santa Barbara, Santa Barbara county, and ROBERT W. JESSUP, residing at Los Angeles, Los Angeles county, State of California, citizens of the United States, have invented an Improvement in Separators; and we hereby declare the following to be a full, clear, and exact description of the same.

Our invention relates to the class of separating devices, and it consists essentially in a vertically rotating disk, a guide-board set at an angle to the plane of said disk and on its uprising side, and having its lower edge separated from the face of the disk, providing a discharge aperture, and a suitable feeding device for supplying the material to be separated to the guide-board.

It also consists in the novel constructions, arrangements and combinations hereinafter fully described and specifically pointed out in the claims.

The object of our invention is to provide a simple and efficient machine for separating the different particles of material according to the difference in their thickness and, incidentally, according to the difference in their roughness. Though it may be applied to the separation of different particles of various materials, it is especially applicable to the cleaning of Lima beans and other seeds, by the separation therefrom of particles of dirt and other extraneous matter, and seeds which differ from the beans and seeds to be saved, both in thickness and roughness.

Referring to the accompanying drawings for a more complete explanation of our invention,—Figure 1 is a vertical section of our separator, on the line $y-y$ of Fig. 2. Fig. 2 is a vertical section on the line $x-x$ of Fig. 1.

A is a frame, in which is mounted a shaft B adapted to be driven by suitable power, as by a belt to the driving pulley $b$. Upon this shaft is mounted, in a vertical plane, a disk C. There may be one or more of these disks in the machine. In the present instance we have shown two.

D is a guide-board. This is inclined at an angle to the plane of the disk, and its lower edge extends down nearly to the face of the disk, being separated therefrom by a space forming a continuous opening $d$ the entire length of the board. The longitudinal direction of the board is radial to the disk, or in the line of a chord of an arc thereof, and it is arranged on the uprising side of said disk, the direction of rotation of which is shown by the arrow. The guide-board is mounted at a slight downward inclination toward its outer end, as shown in Fig. 1, and said board is supported suitably from the frame A. It is, however, best mounted upon the frame A in such a manner that it may be adjusted to or from the face of the disk in order to vary the width of the continuous opening $d$. This mounting may be in any suitable manner as, for example, by the set screw $d'$ working in a slot $d^2$. This guide-board may be only on one side of the disk or, as shown in Fig. 2, there may be one on each side of the disk, and each disk is thus provided with a pair of guide-boards.

E is a feed hopper, the spout $e$ of which extends downwardly beside the disk and is adapted to discharge the material into the guide-board near its upper end. There may be one of these spouts on each side of the disk, as shown in Fig. 2, and thus, for each disk, where two disks are used, there is a pair of feed spouts.

In the lower portion of the frame is mounted the receiving box F, in which is a conveyer $f$ operated by suitable means, as by the pulley $f'$ and belt $f^2$ to the pulley $b'$ upon the main shaft B above.

The operation of the machine is as follows: The material supplied to the hopper E passes down through the spout $e$, and is delivered upon the guide-board D at its head. On account of the lateral inclination of this board, the beans, seeds or other thin material to be saved, are turned up edgewise, and being thin, will pass down through the opening between the lower edge of the board and the side of the disk; but the material to be separated, such as dirt and other foreign matters, or other seeds which have a greater thickness than the beans or seeds to be saved, will not pass down through the opening, but will by contact with the uprising face of the continuously rotating disk be gradually worked off along the length of the board, assisted by gravity due to the inclination of said board, until they reach the lower end and are discharged. The beans or seeds falling down through the bottom aperture of the board fall into the receiving box F and are disposed of by the conveyer. In this operation, the differences in roughness of the particles to be separated assist in the separation, in that the action of the uprising continuously rotating disk is such as to prevent the tendency of the rougher particles from passing downwardly through the aperture, but, on the contrary, tends to hold them up and gradually work them off to the foot of the guide-board.

Having thus described our invention, what we claim as new, and desire to secure by Letters Patent, is—

1. A separator consisting of a disk rotating in a vertical plane, a guide-board arranged upon the uprising side of said disk, and at an angle to the plane of the face thereof, its lower edge being separated from said disk, leaving a continuous opening between said lower edge and the face of the disk, and a supply spout adapted to deliver the material upon the guide-board, substantially as herein described.

2. A separator consisting of a disk rotating in a vertical plane, a guide-board arranged upon the uprising side of said disk, and at an angle to the plane of the face thereof, its lower edge being separated from said disk, leaving a continuous opening between said lower edge and the face of the disk, said guide-board being adjustable to or from the disk whereby said opening may be varied in width, and a supply spout adapted to deliver the material upon the guide-board, substantially as herein described.

3. A separator consisting of a vertically rotating disk, a downwardly inclined guide-board arranged upon the uprising side of said disk and at an angle to the plane of its face, its lower edge being separated from the face of the disk leaving a continuous discharge aperture between it and said disk, and a supply spout arranged to deliver the material upon the head of the guide-board, substantially as herein described.

In witness whereof we have hereunto set our hands.

FAIRFAX H. WHEELAN.
ROBERT W. JESSUP.

Witnesses to signature of Wheelan:
S. H. NOURSE,
WM. F. BOOTH.

Witnesses to signature of Jessup:
JNO. L. TRUSLOW,
FRANK J. CLARK.